Jan. 18, 1955    R. S. CLARK    2,700,123
TRACTION MOTOR CONTROL APPARATUS
Filed March 1, 1950    4 Sheets-Sheet 1
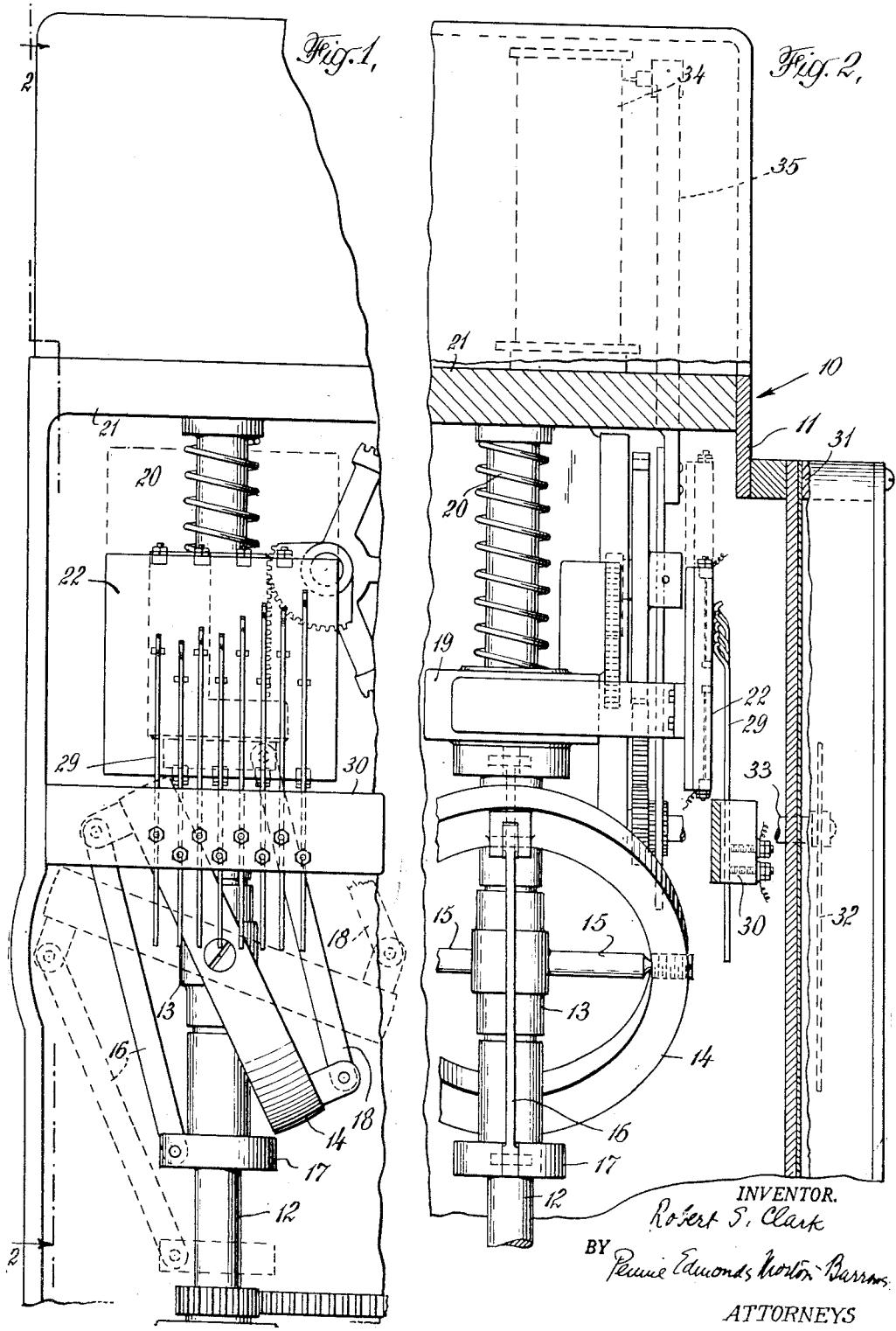
INVENTOR.
Robert S. Clark
BY Pennie Edmonds Morton Barrows
ATTORNEYS Jan. 18, 1955   R. S. CLARK   2,700,123
TRACTION MOTOR CONTROL APPARATUS
Filed March 1, 1950   4 Sheets-Sheet 2
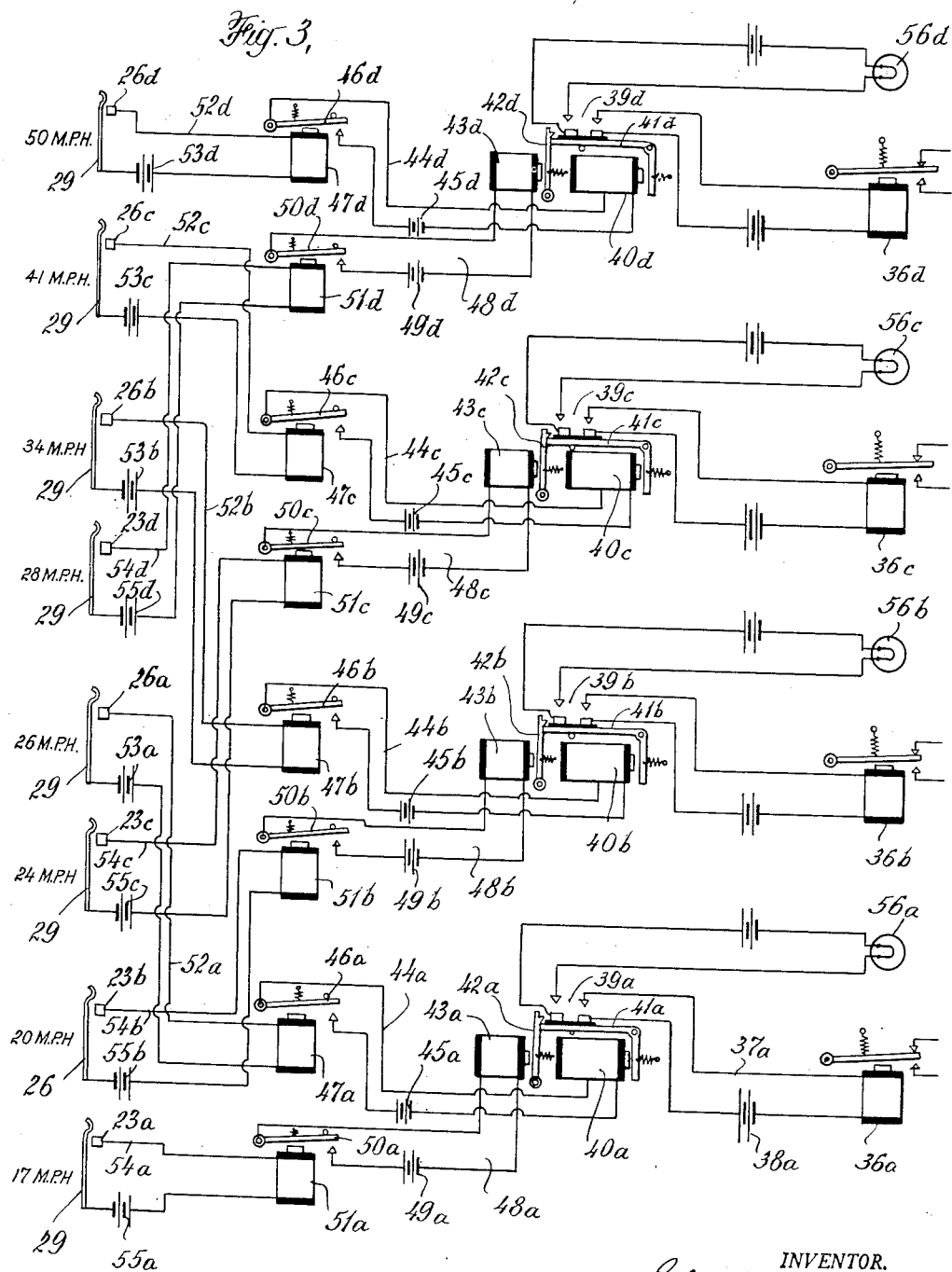

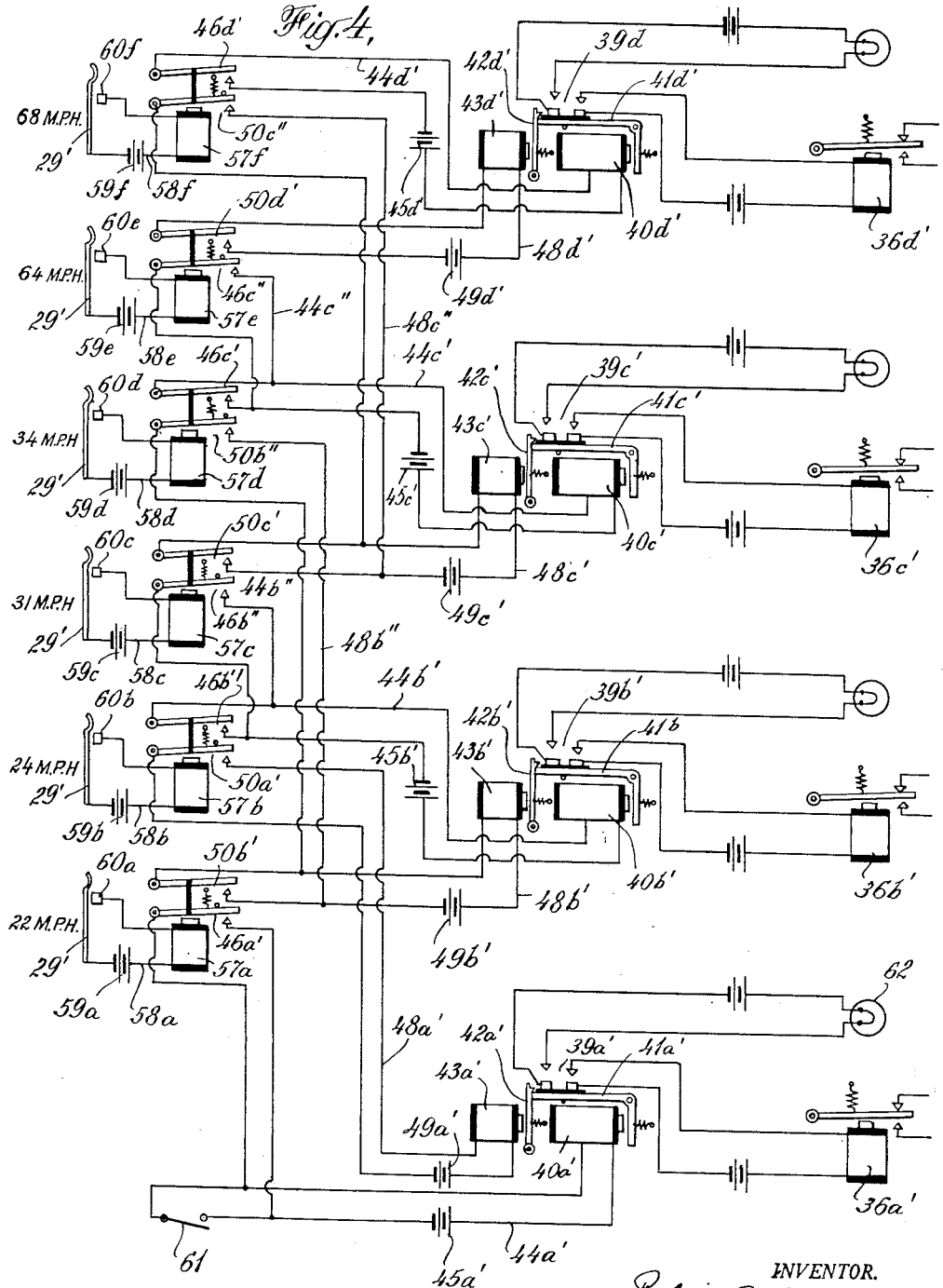

Jan. 18, 1955   R. S. CLARK   2,700,123
TRACTION MOTOR CONTROL APPARATUS
Filed March 1, 1950   4 Sheets-Sheet 4
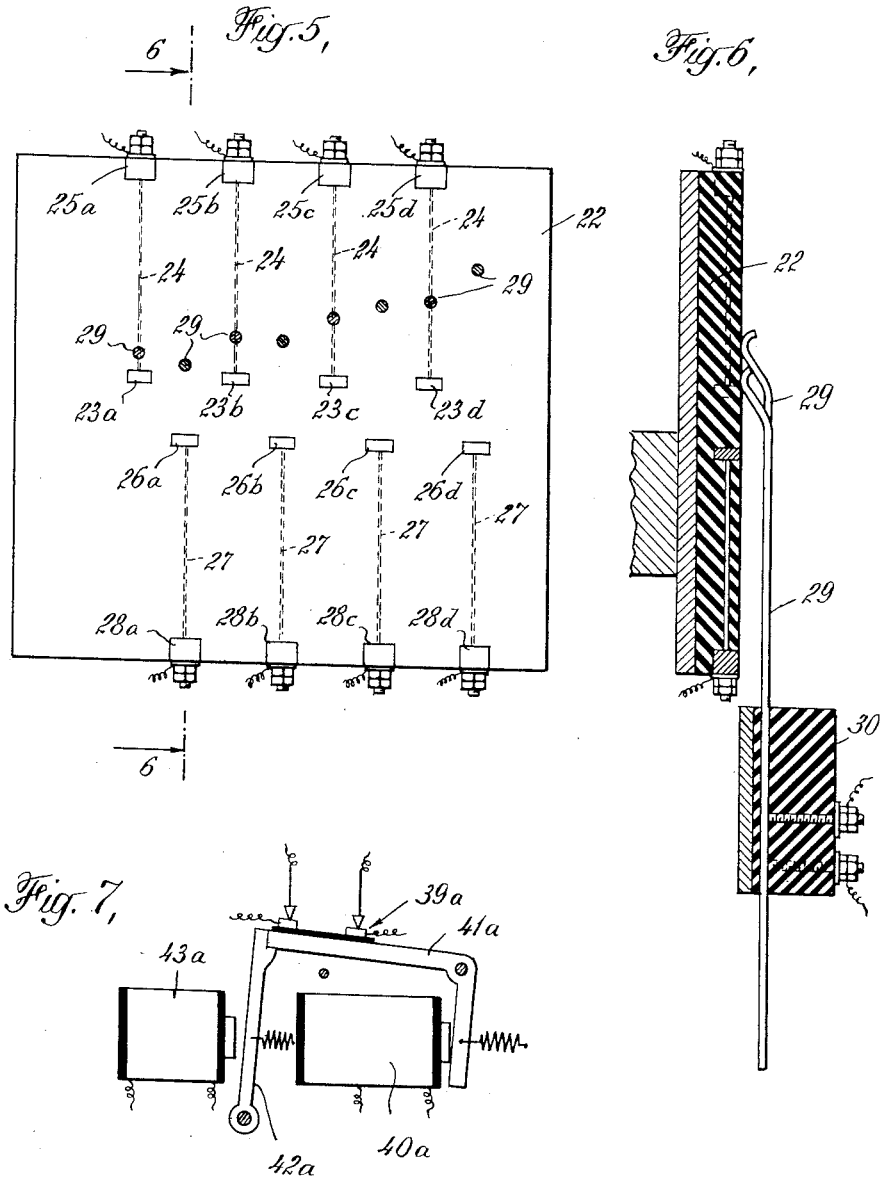
INVENTOR.
Robert S. Clark
BY
Pennie Edmonds Morton & Barrows
ATTORNEYS

United States Patent Office 2,700,123
Patented Jan. 18, 1955

2,700,123

TRACTION MOTOR CONTROL APPARATUS

Robert S. Clark, Albany, N. Y., assignor, by mesne assignments, to Barco Manufacturing Co., a corporation of Illinois Application March 1, 1950, Serial No. 147,089

9 Claims. (Cl. 317—5)

This invention relates to apparatus for controlling the operation of electrically driven locomotives having a plurality of traction motors connected in circuits, which should be modified, as the locomotive speed varies, in order to prevent damage to the motor windings. More particularly, the invention is concerned with a novel control apparatus for use on such locomotives, which operates automatically to effect the desired motor circuit modifications at selected locomotive speeds during acceleration of the locomotive and at other locomotive speeds during deceleration. The apparatus is driven by means responsive to the locomotive speed and this insures that the traction motors will be properly operated at all times. The new apparatus may be employed on electrically driven locomotives taking power from lines or of the diesel-electric type and, since the apparatus is likely to be most widely used on diesel-electric locomotives, an embodiment of the invention adapted for such use will be illustrated and described in detail for purposes of explanation.

At the present time, diesel-electric locomotives are of two general types with respect to the manner in which the traction motor circuits are modified as the locomotive speed varies. In a typical locomotive of one construction, the motors are connected in series, when the locomotive is started, and, as the speed picks up, the circuits are changed to series shunt, then to parallel, and finally to parallel shunt at successively higher speeds. During deceleration, the transitions from one circuit arrangement to another are made in reverse order. In each case, as the new circuit arrangment is established, the former one is cut out, so that the changing of the circuits may be conveniently referred to as non-cumulative. In a typical locomotive of the second construction, shunts are inserted in the motor circuits in successive stages during acceleration and removed during deceleration. In such a locomotive, the circuits established, when the locomotive is started, are modified by additions thereto, so that the circuit modifications are additive in nature. Heretofore, in locomotives of the two types described, in which the transitions from one circuit arrangement to another are effected automatically, it is common practice to employ a transition mechanism, which operates in response to amperage supplied to the motors. Such a mechanism is subject to the objection that, under some operating conditions resulting from changes in profile of the track and from slack running in and out, the transitions are made in such a way as to produce surges in the train, which, in extreme cases, may cause draw-bars to be pulled out and the train to part.

The present invention is, accordingly, directed to a novel apparatus for effecting modifications in the circuits of the traction motors of an electrically driven locomotive, which operates automatically in response to locomotive speeds and, thus, insures that the proper circuits are in use, at all time. The new apparatus may be for either additive or non-cumulative operation and is thus applicable to locomotives of either of the two general classes mentioned above. The apparatus includes a speed-responsive device of the kind frequently used in speed recorders and the device is provided with means for controlling a number of circuits, which in turn control the devices in the locomotive for effecting the traction motor circuit changes. The circuit control means and the speed-responsive device of the apparatus are so constructed that the locomotive devices are actuated successively, either additively or non-cumulatively, during locomotive acceleration, at selected speeds and, during deceleration, at selected other speeds. The speeds, at which the apparatus functions, are chosen in view of the construction of the particular locomotive, with which the apparatus is to be used, and the modifications in the apparatus necessary to permit its use on different locomotives are simple and easily made.

For a better understanding of the invention, reference may be made to the accompanying drawings, in which Fig. 1 is front elevational view, with parts removed, of speed-responsive means employed in the new apparatus;

Fig. 2 is a side elevational view of the mechanism shown in Fig. 1 on the line 2—2 of Fig. 1;

Fig. 3 is a wiring diagram of one form of the new apparatus;

Fig. 4 is a wiring diagram of another form of the new apparatus;

Fig. 5 is a front elevational view of a terminal block employed in one form of the new apparatus;

Fig. 6 is a sectional view on the line 6—6 of Fig. 5; and

Fig. 7 is a view in elevation of one type of relay used in the apparatus.

The new control apparatus includes a speed-responsive mechanism of the type commonly used in the speed indicating and recording instruments employed on locomotives and, if desired, the instrument installed on the locomotive, on which the apparatus is to be mounted, may be utilized as part of the apparatus. If preferred, the new apparatus may include its own speed-responsive mechanism.

In the form of the apparatus illustrated, the speed indicating and recording instrument 10 of the locomotive is employed as part of the apparatus. The instrument comprises a casing 11, into the lower part of which extends a shaft 12 driven by a part of the locomotive at a rate varying with the speed of the locomotive. Shaft 12 in a speed indicating and recording instrument is usually driven by a flexible shaft connected to an axle of the locomotive or by a wheel bearing on the tread of one of the locomotive wheels. A collar 13 is mounted fast on shaft 12 and a governor ring 14 is pivotally mounted on a diameter on arms 15 extending radially from collar 13. A link 16 is connected at one end to the ring 14 at a point midway between the pivot points of the ring and the other end of the link is connected to a collar 17 slidable on shaft 12. Another link 18 is connected at one end to ring 14 at a point diametrically opposite the point of connection of the ring to link 16. The other end of link 18 is connected to a collar 19 slidable on shaft 12 above ring 14. A spring 20 encircling shaft 12 bears at one end on top of collar 19 and at the other end against a partition 21, at the top of the lower section of casing 11.

The collar 19 carries a contact block 22 of insulating material, which carries a plurality of contacts embedded in the block in upper and lower rows with their ends exposed at the face of the block. Contacts 23a, 23b, 23c, and 23d in the upper row are connected by leads 24 embedded in the block to corresponding terminals 25a, 25b, 25c, and 25d at one end of the block. Similarly, contacts 26a, 26b, 26c, and 26d in the lower row are connected by leads 27 to corresponding terminals 28a, 28b, 28c, and 28d at the other end of the block. The contacts in the two rows are engageable by the ends of spring fingers 29 mounted in a block of insulation 30 rigidly supported within the lower part of casing 11, as by being attached to the walls thereof.

The speed indicating and recording instrument 10 includes the usual speed dial 31, over which moves a needle 32 mounted on a shaft 33 driven through suitable connections from the governor ring 14. The upper part of casing 11 contains the usual supply and take-up spools for a record tape, on which a record of speed is made by a pencil carried by a rod moved vertically through suitable connections by the governor ring. One of the spools is indicated at 34 and the rod at 35.

The locomotive, on which the apparatus of the invention is to be used, includes a plurality of devices, which, upon actuation one after another in succession, effect the desired modifications in the traction motor circuits. The diagram in Fig. 3 shows the circuits of a form of the apparatus for use in a locomotive, in which there are four devices, 36a, 36b, 36c, and 36d, the devices being shown as relays and the locomotive being so wired that the modifications in the traction motor circuits are made by additive operation of the devices. The relay 36a is connected in a control circuit 37a containing a source of energy 38a and a control switch 39a operable by electrical means brought into action by the movement of block 22 relative to fingers 29. Each of the other devices 36b, 36c, 36d is in a similar control circuit.

The electrical means operating the switch 39a in the control circuit for device 36a includes a relay 40a having an armature 41a, which closes switch 39a on energization of the relay 40a and thus actuates the device 36a to make the first modification in the traction motor circuits. When armature 41a is moved to close switch 39a, the armature is held closed by the armature 42a of a relay 43a, armature 42a being urged to holding position by a spring. When relay 43a is energized and its armature 42a attracted, it releases armature 41a. Relay 40a may, for convenience, be termed the "make relay" closing switch 39a and relay 43a, the "break relay" opening switch 39a.

The operating coil of relay 40a is in a circuit 44a containing a source of energy 45a and a switch 46a controlled by a relay 47a. The operating coil of relay 43a is in a circuit 48a containing a source of energy 49a and a switch 50a controlled by a relay 51a. Relay 47a is in a circuit 52a containing a source of energy 53a, contact 26a on block 22, and one of the spring fingers 29. Similarly, relay 51a is in a circuit 54a containing a source of energy 55a, contact 23a on block 22, and one of the spring fingers 29.

With the construction described, it will be apparent that the device (relay) 36a for effecting the first change in the traction motor circuits is controlled by relays 40a and 43a, relay 40a being operable to actuate relay 36a and relay 43a being operable to put relay 36a out of action. When relay 36a is actuated by relay 40a, the first shunt is inserted into the traction motor circuits and the shunt remains effective, until relay 43a is actuated.

The contacts 23a, etc. and 26a, etc. and the spring fingers 29 are so arranged that, as the locomotive speed is increased, the fingers engage their respective contacts successively at speeds selected in view of the design and wiring of the traction motors etc. Thus, in a typical locomotive, the fingers 29 may engage their contacts at speeds as follows:

23a at 17 M. P. H.
23b at 20 M. P. H.
23c at 24 M. P. H.
26a at 26 M. P. H.
23d at 28 M. P. H.
26b at 34 M. P. H.
26c at 41 M. P. H.
26d at 50 M. P. H.

The switches 41b, 41c, and 41d controlling the circuit modifying devices 36b, 36c, and 36d respectively, are closable by related make relays 40b, 40c, and 40d and openable by related break relays 43b, 43c, and 43d. Each make relay 40b, 40c, 40d is in a circuit 44a, 44b, or 44c similar to circuit 44a, and is actuated by the closing of a switch 46b, 46c, or 46d. Switches 46b, 46c, and 46d are held open by springs and closed by related relays 47b, 47c, and 47d, which are energized by engagement of a finger 29 with respective contacts 26b, 26c, or 26d. Thus, the four make relays 40a, 40b, 40c, and 40d are operated to actuate their related devices 36a, 36b, 36c, and 36d at locomotive speeds of 26, 34, 41 and 50 M. P. H. Each break relay 43b, 43c, and 43d is in a circuit 48b, 48c, or 48d containing a source of energy 49b, 49c, or 49d and a switch 50b, 50c, or 50d, which is held open by a spring and closable by a relay 51b, 51c, or 51d. The relays 51b, 51c, and 51d are energized by engagement of spring fingers 29 with respective contacts 23b, 23c, or 23d. Thus the four break relays 51a, 51b, 51c, and 51d, operate at respective speeds of 17, 20, 24, and 28 M. P. H. and, whenever a break relay operates, it releases its related switch 41a, if that switch has previously been closed by the make relay of that switch. If the switch is open at the time that its break relay is energized, the switch remains open.

In the operation of the apparatus described, no action takes place during acceleration of the locomotive, until the speed reaches 17 M. P. H. At that speed, the break relay 43a of switch 39a controlling device 36a is energized but, as the switch is open, it is not affected by the action of the break relay. Similarly, the break relays 43b and 43c of switches 39b and 39c are operated at speeds of 20 M. P. H. and 24 M. P. H. without effect on the switches. When the speed reaches 26 M. P. H., the make relay 40a of switch 39a is energized and device 36a is actuated to insert the first shunt in the traction motor circuits and, thus, effect the first modification of the circuits. As the speed of the locomotive increases to 28 M. P. H., the break relay 43d is energized but without effect on its switch 39d. As speeds of 34, 41, and 50 M. P. H., make relays 43b, 43c, and 43d are energized to close their associated switches 39b, 39c, and 39d to actuate devices 36b, 36c, and 36d. The circuit modifications are, accordingly, made during acceleration of the locomotive at speeds of 26, 34, 41, and 50 M. P. H. and, at 50 M. P. H. and above, all four devices 36a, 36b, 36c, and 36d are active and all four shunts are in the motor circuits.

During deceleration of the locomotive, the action is as follows. At speeds of 50, 41, and 34 M. P. H., make relays 40d, 40c, and 40b are successively actuated but without effect, since their related switches 39d, 39c, and 39b have been closed during acceleration and held closed by the spring-pressed armatures 42d, 42c, and 42b of their related break relays 43d, 43c, and 43b. When the locomotive speed drops to 28 M. P. H., break relay 43d is energized and releases its switch 39d, which opens to de-energize device 36d and this cut out the fourth shunt, that was inserted into the motor circuits. At 26 M. P. H., make relay 40a is energized but without effect since its switch 39a is closed at the time. At speeds of 24, 20, and 17 M. P. H., respectively, break relays 43c, 43b, and 43a are energized to release their switches 39c, 39b, and 39a and thus remove the third, second, and first shunts from the motor circuits. Thus during acceleration, the shunts are successively removed in reverse order from the circuits at speeds of 28, 24, 20, and 17 M. P. H. As each device 36a, etc. is actuated by the closing of its switch 39a, etc., a circuit containing a lamp 56a, etc. is closed and the lamp lighted to show that its device is in action.

The wiring diagram of Fig. 4 shows the circuits in a form of the apparatus for non-cumulative operation of devices 36a′, 36b′, 36c′, and 36d′, by which the modifications in the traction motor circuits of a locomotive are effected. Each of the devices is brought into action by a make relay 40a′, 40b′, 40c′, or 40d′, and is put out of action by a break relay 43a′, 43b′, 43c′, or 43d′, the make and break relays being arranged in pairs to operate related switches 39a′, 39b′, 39c′, and 39d′. Make relay 40a′ is in a circuit 44a′ containing a source of energy 45a′ and a switch 46a′ operable by a relay 57a in a circuit 58a with a source of energy 59a. Circuit 58a also contains a contact 60a, mounted in a block similar to block 22, and a spring finger 29′, mounted in a block similar to block 30. Circuit 44a′ may also be closed by a manually operable switch 61. Break relay 43a′ is in a circuit 48a′ containing a source of energy 49a′ and a switch 50a′ operable by a relay 57b in a circuit 58b with a source of energy 59b. Circuit 58b also contains a contact 60b and a spring finger 29′. The remaining break relays 43b′, 43c′, and 43d′ are in circuits similar to circuit 48a′ and are controllable by a contact and a spring finger.

The instrument contains six contacts 60a–60f, inc. and six spring fingers 29′, mounted in respective blocks similar to blocks 22 and 30, and the block carrying the spring fingers is movable by speed-responsive mechanism. The arrangement of the contacts and fingers is such that the fingers engage the contacts at speeds such as the following:

60a at 22 M. P. H.
60b at 24 M. P. M.
60c at 31 M. P. H.
60d at 34 M. P. H.
60e at 64 M. P. H.
60f at 68 M. P. H.

Whenever a contact is engaged by its finger, the corresponding circuit of the 58 group is closed and the relay of the 57 group in that circuit is energized.

Relay 57a is operable to close switch 46a′ in the circuit 44a′ of make relay 40a′, actuating device 36a′ and also switch 50b' in the circuit 48a' of break relay 43b' putting device 36b' out of operation. Relay 57b is operable to close switch 46b' in the circuit 44b' of make relay 40b' actuating device 36b', and switch 50a' in the circuit 48a' of break relay 43a' putting device 36a' out of operation. The circuit 44b' is in shunt with a circuit 44b'' containing a switch 46b'' closable by a relay 57c in a circuit 58c containing a source of energy 59c, a contact 60c, and a finger 29'. Energization of relay 47c also closes switch 50c' in the circuit 48c' of break relay 43c', which, when energized, puts device 36c' out of operation.

Each of the relays of the 57 group is operable to close a pair of switches to establish the circuit of a make relay controlling one of the devices of the 36 group, and to establish the circuit of a break relay controlling another of the devices. From an inspection of the wiring diagram of Fig. 4, it will be apparent that the operation of the non-cumulative form of the apparatus is as follows:

When the locomotive is to be started, the engineer closes switch 61 and make relay 40a' closes switch 39a' to put device 36a' into action to make the first traction motor circuit arrangement effective. During acceleration of the locomotive, the make relay 40a' of device 36a' and the break relay 43b' of device 36b' are energized, when the locomotive speed reaches 22 M. P. H., but, since switch 39a has already been closed and switch 39b' is open, energization of relays 40a' and 43b' at this time is without effect. At a locomotive speed of 24 M. P. H., the break relay 43a' is energized to release switch 39a', which is then opened by its spring to put device 36a' out of operation. At the same speed, the make relay 40b' is energized, device 36b' operates, and the second motor circuit arrangement is made effective. At 31 M. P. H. the make relay 40b' of device 36b' and the break relay 43c' of device 36c' are energized but no change in the motor circuits occurs. At 34 M. P. H., the make relay 40c' of device 36c' and the break relay 43b' of device 36b' are energized. This causes device 36b' to be put out of action and device 36c' to be actuated, so that the second traction motor circuit arrangement is made ineffective and the third arrangement is made effective. At 64 M. P. H., the make relay 40c' of device 36c' and the break relay 43d' are energized but no change in the motor circuits occurs. At 68 M. P. H., the make relay 43c' of device 36c' and the break relay 40d' of device 36d' are actuated with the result that the third motor circuit arrangement is replaced by the fourth.

During deceleration of the locomotive, the fourth motor circuit arrangement is replaced by the third at 64 M. P. H., and the third arrangement is replaced by the second at 31 M. P. H. The second motor circuit arrangement remains effective, until the locomotive speed drops to 22 M. P. H., and at the same speed, the first motor circuit arrangement comes into action. Thus, the traction motor circuit arrangements are put into operation successively at selected speeds during deceleration. Whenever a circuit arrangement is in use, the closing of the switch of the group controlling the device, which puts that arrangement into use, also lights a lamp 62, associated with the device, to show that the arrangement is active.

In the new control apparatus, the changes in the motor circuit arrangements are made automatically at the appropriate speeds, which are different in acceleration and deceleration. The devices establishing the arrangements are controlled by electrical means, including the make and break relays, and such means are, in turn, controlled by means, including relays, such as those of the 47 and 51 groups, which means are brought into action by the spring fingers and contacts. The relays, which are energized by engagement of the contacts and fingers, have been shown as quick-acting, but slow-acting relays may be employed to avoid repeated action of the relays, in the event that the locomotive speed is approximately that, at which a finger engages a contact, and fluctuates above and below that speed.

I claim:

1. An apparatus for use on an electrically driven locomotive, which is provided with a plurality of traction motors and devices for effecting modifications in the motor circuits, the apparatus being operable to actuate said devices and comprising the combination of a plurality of electrical means for controlling the operation of respective devices, a mechanism adapted to be driven from a part of the locomotive at a rate varying with the speed of the locomotive and including a member movable to different predetermined positions in response to variation in the speed, and means operably connectable to said electrical means by movement of the member to said predetermined positions to render the electrical means effective to actuate the devices successively in a predetermined order at certain speeds during acceleration of the locomotive and to actuate the devices successively in reverse order at certain other and lower speeds during deceleration of the locomotive.

2. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means for controlling the operation of respective switches, a mechanism adapted to be driven from a part of the locomotive at a rate varying with the speed of the locomotive and including a member movable to different predetermined positions in response to variation in the speed and means operably connectable to second electrical means by movement of the member to said predetermined positions to render the electrical means effective to actuate the switches successively in a predetermined order at certain speeds during acceleration of the locomotive and to actuate the switches successively in reverse order at certain other and lower speeds during deceleration of the locomotive.

3. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means operable to open and close respective switches, a mechanism adapted to be driven from a part of the locomotive at a rate varying with the speed of the locomotive and including a member movable to different predetermined positions in response to variation in the speed, and means operably connectable to said electrical means by movement of the member to said predetermined positions to render the electrical means effective to actuate the switches, said operably connectable means including a first set of means operable to render the electrical means effective to close the switches successively in a predetermined order at certain speeds during acceleration of the locomotive and a second set of means operable to render the electrical means effective to open the switches successively in reverse order at certain other speeds during deceleration of the locomotive.

4. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means each operable to close a switch in one energizing circuit and open a switch in another energizing circuit, a mechanism adapted to be driven from a part of the locomotive at a rate varying with the speed of the locomotive and including a member movable to different predetermined positions in response to variation in the speed of the locomotive, and means operably connectable to said electrical means by movement of the member to said predetermined positions to render the electrical means effective to open and close the switches, said operably connectable means including a first set of means effective to open and close the switches in such manner as to energize the devices successively in a predetermined order at certain speeds during acceleration of the locomotive and a second set of means effective to open and close the switches in such manner as to energize the devices successively in reverse order at certain other speeds during deceleration of the locomotive.

5. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means each operable to close a switch in one energizing circuit and open a switch in another energizing circuit, a relay for operating each electrical means, a mechanism adapted to be driven from a part of the locomotive at a rate varying with the speed of the locomotive and including a member movable to different predetermined positions in response to variation in the speed of the locomotive, and means operably connectable to said relays by movement of the member to said predetermined positions to render the relays effective to open and close the switches, said operably connectable means including a first set of means effective to actuate the relays in such manner as to energize the devices successively in a predetermined order at certain speeds during acceleration of the locomotive and a second set of means effective to actuate the relays in such manner as to energize the devices successively in reverse order at certain other speeds during deceleration of the locomotive.

6. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means each including a relay for closing a switch in one energizing circuit and a relay for opening a previously closed switch in another energizing circuit, a mechanism adapted to be driven from a part of the locomotive at a rate varying with the speed of the locomotive and including a member movable to different predetermined positions in response to variation in the speed of the locomotive, and means operably connectable to said relays by movement of the member to said predetermined positions to render the relays effective to actuate the devices, said operably connectable means including a first set of means operable to control the relays to establish the energizing circuits successively in a predetermined order at certain speeds during acceleration of the locomotive, with one circuit being broken as the next is closed, and a second set of means operable similarly to establish the energizing circuits successively in the reverse order at other speeds during deceleration of the locomotive.

7. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means for controlling the operation of respective switches, a shaft adapted to be driven from a part of the locomotive at a rate varying with the speed of the locomotive, a governor ring mounted on the shaft and assuming different positions relative thereto as the speed of the shaft varies, a member mounted for movement by the ring and carrying a plurality of contacts, a plurality of fixed contacts in the circuits of said electrical means and engageable with the contacts on said member to close the circuits of said electrical means, the contacts on the member and the fixed contacts being so arranged that the electrical means operate the switches to actuate the devices in a sequence at certain speeds during acceleration of the locomotive and actuate the devices in reverse order at other speeds during deceleration of the locomotive.

8. An apparatus for use on an electrically driven locomotive, which is provided with a plurality of traction motors and devices for effecting modifications in the motor circuits, the apparatus being operable to actuate said devices and comprising the combination of a plurality of electrical means for controlling the operation of respective devices, a mechanism adapted to be driven from a part of the locomotive at a rate varying with the speed of the locomotive and including a member movable to different predetermined positions in response to variation in the speed, and mechanism operably connectable to said electrical means by movement of the member to said predetermined positions to render the electrical means effective to actuate the devices, said last mentioned mechanism comprising a first set of means operable to render the electrical means effective to actuate the devices successively in a predetermined order at certain speeds during acceleration of the locomotive and a second set of means operable to render the electrical means effective to actuate the devices successively in reverse order at certain other speeds during deceleration of the locomotive.

9. An apparatus for use on an electrically driven locomotive, which is provided with a plurality of traction motors, devices for effecting modifications in the motor circuits, energizing circuits for the devices, and switches in the energizing circuits, the apparatus being operable to actuate the switches and comprising the combination of a plurality of electrical means for controlling the operation of respective switches, a mechanism adapted to be driven from a part of the locomotive at a rate varying with the speed of the locomotive and including a member movable to different predetermined positions in response to variation in the speed, and mechanism operably connectable to said electrical means by movement of the member to said predetermined positions to actuate the switches, said last mentioned mechanism comprising a first set of means operable to actuate the switches to operate the devices successively in a predetermined order at certain speeds during acceleration of the locomotive and a second set of means operable to actuate the switches to operate the electrical devices successively in reverse order at certain other speeds during deceleration of the locomotive.

References Cited in the file of this patent

UNITED STATES PATENTS

| Number | Name | Date |
|---|---|---|
| 549,874 | Larson | Nov. 12, 1895 |
| 1,045,647 | Wallace | Nov. 26, 1912 |
| 1,110,900 | Core | Sept. 15, 1914 |
| 1,394,111 | Olds | Oct. 18, 1921 |
| 1,438,944 | Conway | Dec. 19, 1922 |
| 1,569,223 | Gore | Jan. 12, 1926 |
| 1,842,384 | Blanchard | Jan. 26, 1932 |
| 1,912,924 | Utne et al. | June 6, 1933 |
| 1,935,429 | Barton | Nov. 14, 1933 |
| 2,066,920 | Willby et al. | Jan. 5, 1937 |
| 2,130,858 | Riley | Sept. 20, 1938 |
| 2,140,642 | Farmer | Dec. 20, 1938 |
| 2,163,605 | Kampa | June 27, 1939 |
| 2,216,364 | Dezzani | Oct. 1, 1940 |
| 2,306,505 | Sexton | Dec. 29, 1942 |
| 2,364,751 | Place | Dec. 12, 1944 |
| 2,381,321 | Thiesen | Aug. 7, 1945 |
| 2,400,971 | Barclay | May 28, 1946 |
| 2,467,400 | Murray | Apr. 19, 1949 |
| 2,474,610 | Wunsch | June 28, 1949 |